Aug. 22, 1933.   V. RENDA   1,923,887

POWER MECHANISM

Filed March 8, 1933

Inventor:
Vincent Renda
By Chapman & Ferguson
Attorney

Patented Aug. 22, 1933

1,923,887

UNITED STATES PATENT OFFICE 1,923,887

POWER MECHANISM

Vincent Renda, Baltimore, Md.

Application March 8, 1933. Serial No. 660,007

2 Claims. (Cl. 253—4)

This invention relates to an improved power mechanism, and has for its object to utilize power derived from the motion of waves.

The invention consists of the novel construction and arrangement of the parts and combination of parts hereinafter more fully set forth in the following specification and pointed out in detail in the appended claims.

In the accompanying drawing,—

Figure 1:
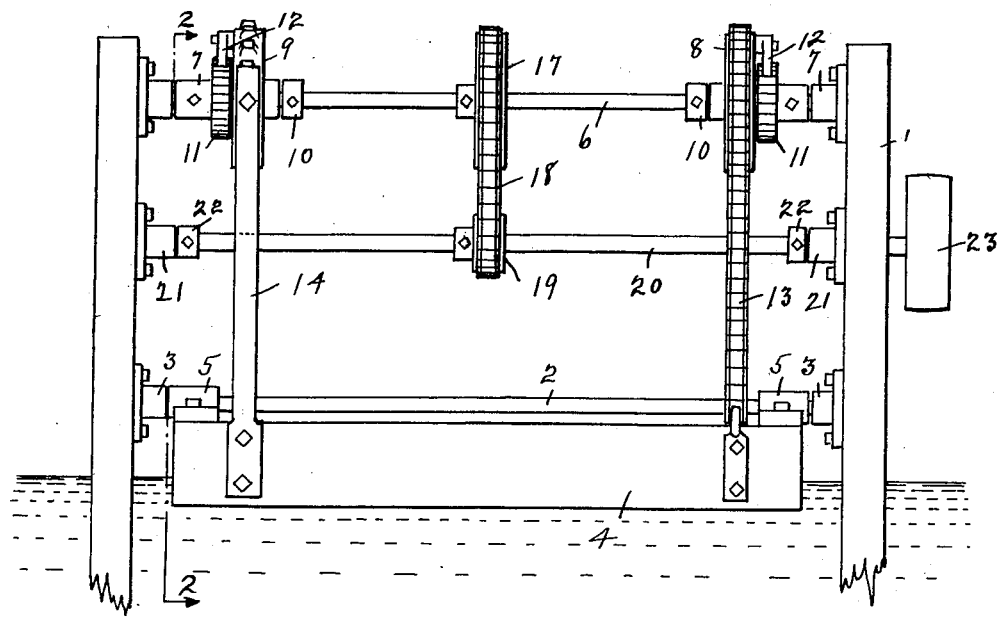
Figure 1 is an elevation of my invention showing the position of same with relation to the water.
Figure 2:
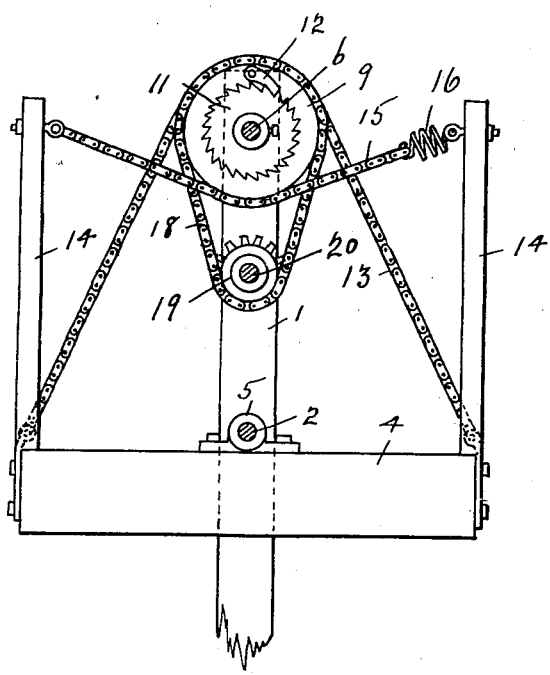
Figure 2 is a section on the line 2—2 of Figure 1.
Figure 3:
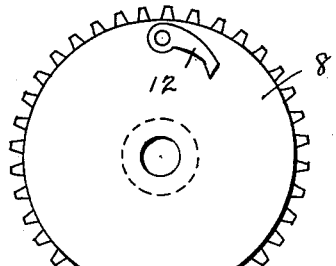
Figure 3 is an enlarged detail side view of one of the sprocket wheels which are loosely mounted on the upper shaft and showing the pawl secured to the side thereof.
Figure 4:
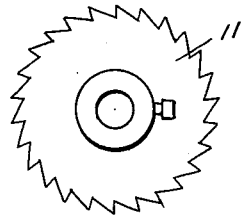
Figure 4 is an enlarged detail side view of one of the ratchet wheels.

Referring to the accompanying drawing, forming part of this specification, and in which like reference numerals designate like parts throughout the several views thereof, 1 designates the uprights which have their lower ends down in the bed under the water. Extending across between the uprights 1 is a shaft 2 mounted in the bearings 3 which latter are secured to the inner surfaces of the uprights 1. A float 4 is mounted on the shaft 2 by the bearings 5 at each end thereof and rests in the water and is adapted to be rocked on said shaft 2 by the action of the waves. Between the upper ends of the uprights 1 is a shaft 6 mounted in the bearings 7. Loosely mounted on the shaft 6 are two sprocket wheels 8 and 9 which are held from moving lengthwise in one direction on said shaft by the collars 10 which latter are fast to the shaft 6. The ratchet wheels 11 are rigidly mounted on the shaft 6 adjacent the sprocket wheels 8 and 9, which latter are each provided with a pawl 12 which operates against the ratchet wheels 11 to turn the shaft 6. At one end of the float 4 is secured on opposite sides the ends of a sprocket chain 13 which passes over the top of the sprocket wheel 8, and at the opposite end of the float 4 are secured two uprights 14 to which is secured the sprocket chain 15 which passes under the sprocket wheel 9. On one end of the chain 15 is secured a coiled spring 16 to take up any slack therein. When the float 4 is rocked on the shaft 2 by the action of the waves the sprocket chains operating on the sprocket wheels 8 and 9 will, through the medium of the pawls 12 and ratchets 11, cause the shaft 6 to continue to revolve always in the same direction owing to the fact that the chain 13 operates on the top of the sprocket wheel 8 and the chain 15 operates on the under side of the sprocket wheel 9. Near the center of the shaft 6 is rigidly fixed a sprocket wheel 17 which is connected by a sprocket chain 18 to a small sprocket wheel 19 rigidly mounted on the shaft 20. The said shaft 20 is mounted in the bearings 21 and is held securely therein by the collars 22. One end of the shaft 20 projects through one of the uprights 1 and is provided with a pulley 23 from which power may be carried to any desired point.

The rocking of the float 4 causes the shaft 6 to be continuously revolved in one direction and power is transmitted therefrom to the shaft 20 through the sprocket wheels 17 and 19 and sprocket chain 18, and from the shaft 20 to any desired point.

Having thus described my invention what I claim is:

1. A power mechanism comprising a frame, a float mounted in said frame and adapted to rock therein, a shaft mounted in the upper ends of said frame, two sprocket wheels loosely mounted on said shaft, and each having a pawl pivoted thereto, two ratchet wheels rigidly mounted on said shaft, one adjacent each sprocket wheel and against which the said pawls operate, a sprocket chain at one end of said float and having its ends secured to opposite sides thereof and extending over one of the said sprocket wheels, and a sprocket chain on the other end of said float and having its ends secured to opposite sides of the float and extending under the other sprocket wheel.

2. A power mechanism comprising a frame, a float mounted in said frame and adapted to rock therein, a shaft mounted in the upper ends of said frame, two sprocket wheels loosely mounted on said shaft, and each having a pawl pivoted thereto, two ratchet wheels rigidly mounted on said shaft, one adjacent each sprocket wheel and against which the said pawls operate, a sprocket chain at one end of said float and having its ends secured to opposite sides thereof and extending over one of the said sprocket wheels, a sprocket chain on the other end of said float and having its ends secured to opposite sides of the float and extending under the other sprocket wheel, a sprocket wheel rigidly mounted on said shaft, a second shaft mounted in said frame below said first named shaft, a sprocket wheel rigidly mounted on said second shaft, and a chain connecting said rigidly mounted sprocket wheels on said two shafts.

VINCENT RENDA.